(12) United States Patent  (10) Patent No.: US 8,128,563 B2
Kristoffersen  (45) Date of Patent: Mar. 6, 2012

(54) METHOD AND APPARATUS FOR REDUCING SIZE OF ULTRASOUND TRANSDUCER CABLE

(75) Inventor: Kjell Kristoffersen, Oslo (NO)

(73) Assignee: General Electric Company, Schenectady, NY (US)

( * ) Notice: Subject to any disclaimer, the term of this patent is extended or adjusted under 35 U.S.C. 154(b) by 1104 days.

(21) Appl. No.: 11/872,891

(22) Filed: Oct. 16, 2007

(65) Prior Publication Data
US 2009/0096327 A1   Apr. 16, 2009

(51) Int. Cl.
*A61B 8/00*   (2006.01)
(52) U.S. Cl. ........ 600/437; 600/443; 600/449; 600/453; 600/447; 600/459
(58) Field of Classification Search .................. 600/437, 600/443, 449, 453, 447, 459
See application file for complete search history.

(56) References Cited

U.S. PATENT DOCUMENTS

| | | | |
|---|---|---|---|
| 5,349,262 A | | 9/1994 | Grenon et al. |
| 5,882,309 A | * | 3/1999 | Chiao et al. .................. 600/459 |
| 5,902,241 A | * | 5/1999 | Seyed-Bolorforosh et al. ............................. 600/443 |
| 6,183,419 B1 | | 2/2001 | Wildes |

OTHER PUBLICATIONS

Wildes et al., Elevation Performance of 1.25D and 1.5D Transducer Arrays, IEEE Transactions on Ultrasonics, Ferroelectrics, and Frequency Control, vol. 44, No. 5, Sep. 1997, pp. 1027-1037.

* cited by examiner

*Primary Examiner* — Brian Casler
*Assistant Examiner* — Joel Lamprecht
(74) *Attorney, Agent, or Firm* — The Small Patent Law Group; Dean D. Small

(57) ABSTRACT

Ultrasound transducer comprises an array of elements forming rows and columns and wires within a transducer cable configured to connect at least a portion of the elements to an ultrasound system. The array comprises a central row and at least first and second outer rows positioned along opposite sides of the central row. First set of lines electrically connects elements within a first portion of the central row to one of the wires. First portion comprises less than a total number of elements within the central row. Second set of lines electrically connects at least a portion of the elements within first and second outer rows that are in the same column and electrically connects elements within a second portion of the central row to elements that are in the same column. Each line within the second set of lines is connected to one of the wires.

21 Claims, 5 Drawing Sheets

METHOD AND APPARATUS FOR REDUCING SIZE OF ULTRASOUND TRANSDUCER CABLE

BACKGROUND OF THE INVENTION

This invention relates generally to ultrasound imaging and more particularly to ultrasound transducers.

Ultrasound systems may be configured to use different types of transducers, such as one-dimensional (1D), 2D and/or 3D transducers. 1D transducers have a 1D array that can be arbitrarily steered and focused in the azimuth (in-plane) dimension. In the elevation (out-of-plane) dimension, the transducer typically has a fixed focus formed by using an array that is mechanically curved in the elevation direction or by using an acoustic lens, such as a silicon lens. A disadvantage of the 1D transducer is that an ultrasound image is created with a slice thickness that is optimal only in a range that is close to the focus of the lens.

2D arrays may be used to electronically control the focus in the out-of-plane dimension, allowing dynamic steering and focusing in any direction, including the elevation dimension. Unfortunately, this configuration greatly increases the number of channels in the system needed to drive the transducer as well as the number of electrical wires, such as coaxial cables, in the transducer cable. For example, for a square transducer having N elements along a side, $N^2$ coaxial cables within the transducer cable and $N^2$ channels for transmit and receive are needed.

Large numbers of wires or coaxial cables result in a transducer cable that is large and/or inflexible. The weight and inflexibility of the cable result in stress on the operator conducting the ultrasonic scanning, and may lead to repetitive stress injuries and fatigue. Also, the larger number of channels and coaxial cables increase the cost of both the system and transducer.

Several different transducers have been developed to address these problems. One type of transducer may be referred to as a 1.75D transducer. The 1.75D transducer may have N elements in azimuth and 2*M+1 elements in elevation (wherein M is a positive integer that is much smaller than N). This reduces the element count significantly compared to a 2D array with square elements. However, (2*M+1)*N coaxial cables and system channels are needed, which is at least three times the number needed for the 1D transducer.

Focusing delays of a 2D array scanning in the elevation plane are symmetrical along the elevation midline. A further reduction of coaxial cables may thus be obtained by electrically connecting elements that are symmetrically located along the midline. This type of array is typically referred to as a 1.5D array and is capable of dynamic elevation focusing on receive. After electrically connecting the elements, (M+1)*N coaxial cables and system channels are needed. This is lower than for the 1.75D array, but still at least twice the number needed for the 1D transducer.

A 1.25D array has also been used. The elevation aperture of the 1.25D array can be selected to increase with range, but the elevation focus of the aperture is static and determined by a mechanical lens. Typically, this type of array has a few programmable, such as 2-4, selections of apertures/foci, and the selection of the aperture/focus may be performed by electronic multiplexing circuits located in the transducer. The number of coaxial cables and system channels needed is no larger than for a 1D transducer. Switching between different selections is associated with artifacts, however, so dynamic focusing during reception is typically not feasible. This configuration may not be acceptable in scanning applications where frame rates are critical.

In another method, the elevation width of the array elements increases away from the midpoint of the array. The same number of system channels is required as the 1D array, while some degree of dynamic elevation focusing is possible on receive. However, the active area of the transducer aperture is reduced, resulting in a reduced far-field sensitivity compared to a 1.25D or 1.5D transducer.

Therefore, a need exists for a transducer capable of dynamic elevation focusing without sacrificing sensitivity or frame rate, and also without requiring a large increase in coax and system channel count compared to a 1D transducer.

BRIEF DESCRIPTION OF THE INVENTION

In one embodiment, an ultrasound transducer comprises an array of elements forming rows and columns and wires within a transducer cable that are configured to connect at least a portion of the elements to an ultrasound system. The array comprises a central row and at least first and second outer rows positioned along opposite sides of the central row. A first set of lines electrically connects each of the elements within a first portion of the central row to one of the wires. The first portion comprises less than a total number of the elements within the central row. A second set of lines electrically connects at least a portion of the elements within the first and second outer rows that are in the same column and electrically connects the elements within a second portion of the central row to the elements that are in the same column. Each of the lines within the second set of lines is connected to one of the wires.

In another embodiment, a method for forming and using an ultrasound transducer comprises defining a number K of elements in a first dimension of an array. A number of rows is defined in a second dimension of the array, wherein the number of rows is at least 3. A first portion of the elements is connected in a 1.5 dimensional (1.5D) array configuration, and a second portion of the elements is connected in a 1D array configuration.

In yet another embodiment, an ultrasound transducer comprises an array of elements forming rows and columns comprising at least a central row and at least first and second outer rows positioned along opposite sides of the central row. Wires within a transducer cable are configured to connect at least a portion of the elements to an ultrasound system. A multiplexer is connected to the wires and to the elements. The multiplexer electrically connects at least a portion of the columns of the elements within the first and second outer rows to each other and to one of the wires. The multiplexer is configured to select a first portion of the elements within the central row. The multiplexer electrically connects each of the elements within the first portion to one of the wires, and the multiplexer electrically connects at least a portion of the elements within the central row outside of the first portion to the corresponding columns of the elements within the first and second rows.

DETAILED DESCRIPTION OF THE INVENTION

Figure 1:
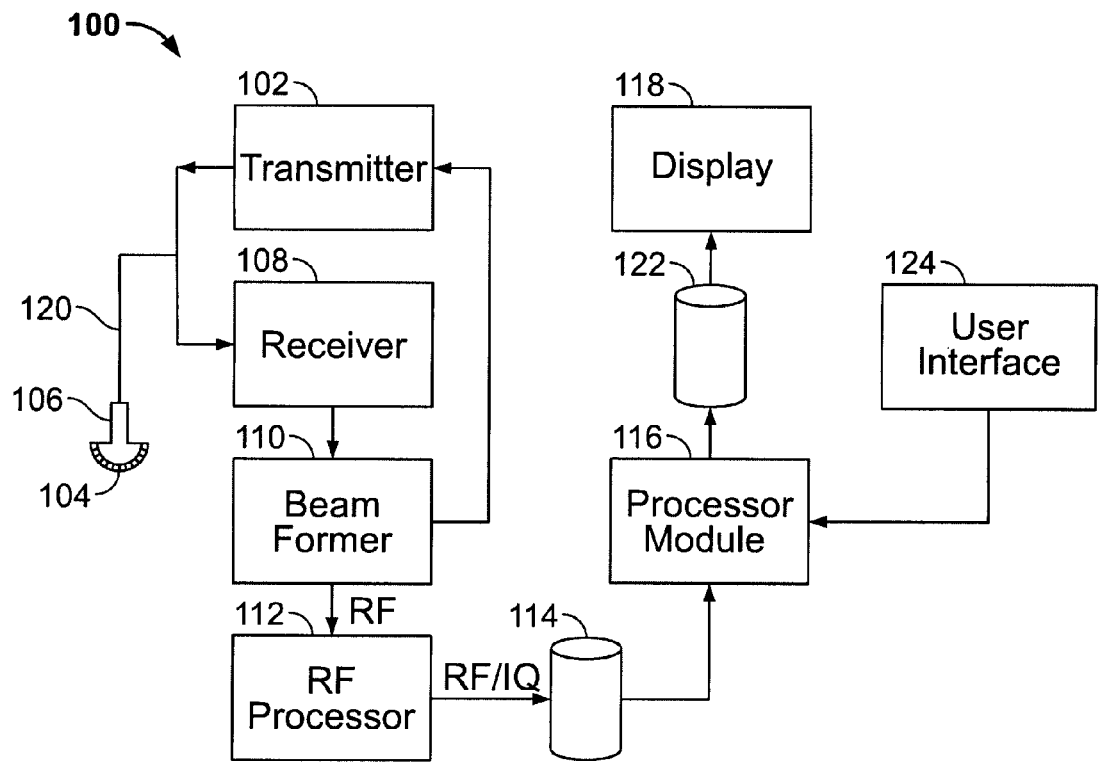
FIG. 1 illustrates an ultrasound system formed in accordance with an embodiment of the present invention.

The foregoing summary, as well as the following detailed description of certain embodiments of the present invention, will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (e.g., processors or memories) may be implemented in a single piece of hardware (e.g., a general purpose signal processor or random access memory, hard disk, or the like). Similarly, the programs may be stand alone programs, may be incorporated as subroutines in an operating system, may be functions in an installed software package, and the like. It should be understood that the various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

FIG. 1 illustrates an ultrasound system 100 including a transmitter 102 that drives an array of elements 104 (e.g., piezoelectric elements) within a transducer 106 to emit pulsed ultrasonic signals into a body. Transducer cable 120 has wires (not shown) therein that convey transmit and receive signals between the system 100 and the transducer 106. The wires may be electrical wires, lines, leads, conductors, coaxial cables, and the like. The wires are flexible such as to allow easy movement and positioning of the transducer cable 120. The ultrasonic signals are back-scattered from structures in the body, like fatty tissue or muscular tissue, to produce echoes that return to the elements 104. The echoes are received by a receiver 108. The received echoes are passed through a beamformer 110, which performs beamforming and outputs an RF signal. The RF signal then passes through an RF processor 112. Alternatively, the RF processor 112 may include a complex demodulator (not shown) that demodulates the RF signal to form IQ data pairs representative of the echo signals. The RF or IQ signal data may then be routed directly to a memory 114 for storage.

The ultrasound system 100 also includes a processor module 116 to process the acquired ultrasound information (e.g., RF signal data or IQ data pairs) and prepare frames of ultrasound information for display on display 118. The processor module 116 is adapted to perform one or more processing operations according to a plurality of selectable ultrasound modalities on the acquired ultrasound information. Acquired ultrasound information may be processed and displayed in real-time during a scanning session as the echo signals are received. Additionally or alternatively, the ultrasound information may be stored temporarily in memory 114 during a scanning session and then processed and displayed in an off-line operation.

The processor module 116 is connected to a user interface 124 that may control at least some operations of the processor module 116. The display 118 includes one or more monitors that present patient information, including diagnostic ultrasound images to the user for diagnosis and analysis. One or both of memory 114 and memory 122 may store data sets of the ultrasound data that may be accessed to present images. The images may be modified and the display settings of the display 118 also manually adjusted with the user interface 124.

Figure 2:
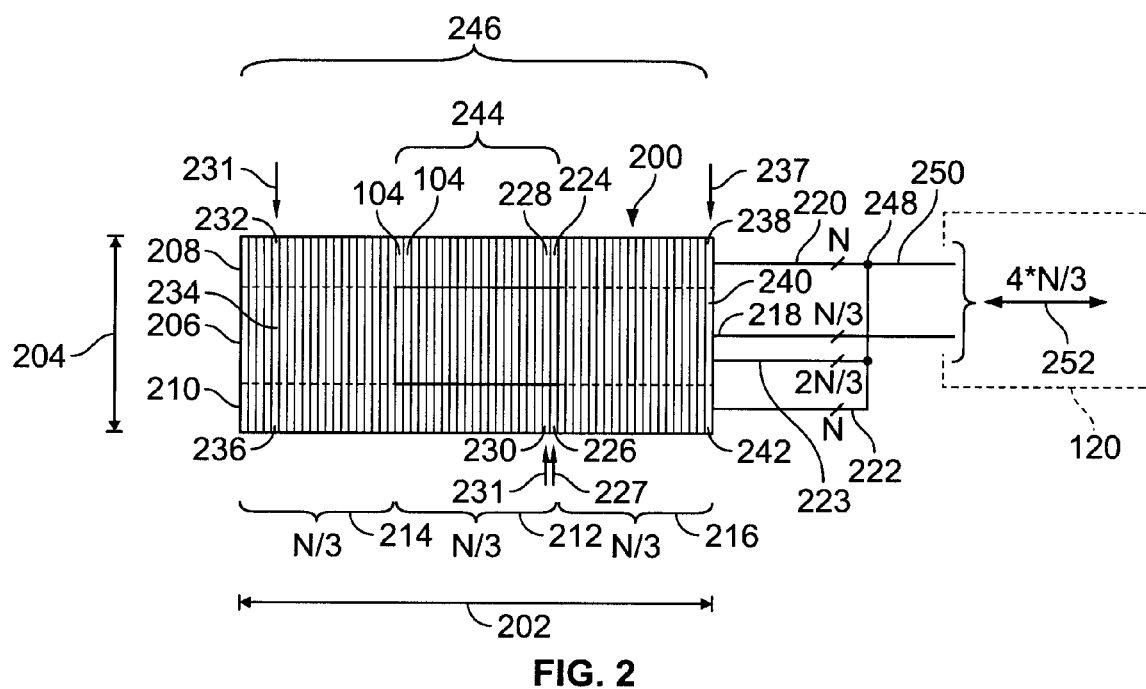
FIG. 2 illustrates an array of transducer elements configured to reduce the number of wires and system channels needed to drive the transducer in accordance with an embodiment of the present invention.

FIG. 2 illustrates an array 200 of elements 104 configured to reduce the number of wires and channels and thus minimize the size of the transducer cable 120. The array 200 of elements 104 is arranged in first and second dimensions 202 and 204, such as in rows and columns. The first dimension 202 may also be referred to as the azimuthal dimension and the second dimension 204 may also be referred to as the elevational dimension. In one embodiment, the configuration of FIG. 2 may be referred to as a 1.375D array.

In the second dimension 204 there are three rows of elements 104, a central row 206, a first outer row 208 and a second outer row 210. In one embodiment, there may be additional outer rows formed symmetrically around the central row 206 in pairs. Therefore, the total number of rows may be an odd number. In another embodiment, the elevational width of the elements 104 (e.g. along the second dimension 204) within the central row 206 may each be approximately two times the elevational width of an element 104 within the first and second outer rows 208 and 210.

There are N elements 104 along the first dimension 202. The number N may be modified based on the desired size of the transducer 106 and is not limited to any particular number. The N elements 104 are divided into three portions, a first portion 212, a second portion 214 and a third portion 216. Each of the first, second and third portions 212-216 has a third of the total number of elements 104 in the first dimension 202, or N/3 elements 104. In another embodiment, the first, second and third portions 212-216 may have different numbers of elements 104, and in another embodiment, the first portion 212 may have a first number of elements 104 while the second and third portions 214 and 216 have a different number of elements 104.

The first portion 212 is positioned at a central portion 244 of an aperture 246 of the array 200. The aperture 246 is shown as covering the entire array 200, however, the aperture 246 may be smaller and use less than the total number of elements 104 within the array 200.

The elements 104 within the first portion 212 are connected as a 1.5D array, while the elements 104 within the second and third portions 214 and 216 are connected as 1D arrays. A line is electrically connected to each of the elements 104 in the central row 206 within the first portion 212, resulting in a first set of lines 218 that has N/3 lines. The elements 104 connected to the first set of lines 218 are thus individually controllable. Each of the elements 104 in the first and second outer rows 208 and 210 is connected to one of N lines within second and third sets of lines 220 and 222, respectively. The elements 104 in the central row 206 that are within one of the second and third portions 214 and 216 are each connected to a line within a fourth set of lines 223 that has 2N/3 lines.

To configure the first portion 212 as a 1.5D array, the elements 104 within the first and second outer rows 208 and 210 that are aligned with respect to each other along the second dimension 204, or along a column, are electrically connected. For example, elements 224 and 226 in column 227 are electrically connected to a single line and elements 228 and 230 in column 231 are electrically connected to a different single line.

To configure the second and third portions 214 and 216 as 1D arrays, the elements 104 within the central row 206 and the first and second outer rows 208 and 210 that are aligned with respect to each other along the second dimension 204 are electrically connected. For example, a column 231 of elements 232, 234 and 236 within the second portion 214 are connected to one line and another column 237 of elements 238, 240 and 242 within the third portion 216 are connected to a different line.

Point 248 indicates the electrical connection of elements 104 that are aligned with respect to each other in the second dimension 204. The second, third and fourth sets of lines 220, 222 and 223 are connected together at the point 248, resulting in a single set of N lines 250. The set of N lines 250 and the first set of lines 218 result in a total of 4N/3 wires 252 within the transducer cable 120. In comparison, a 1.5D transducer with three rows of elements has 2N wires within the transducer cable 120.

This configuration maintains the main advantages of the 1.5D array while the number of wires and channels is significantly reduced (from 2*N to 4*N/3). The configuration of the array 200 may be used for elevation focusing in both transmit and receive and for dynamic focusing on receive. The first portion 212, or central portion 244, of the aperture 246 may be beamformed on transmit or receive using conventional delay processing. In other words, each element 104 in the central row 206 in the central portion 244 may be individually controlled by the beamformer 110. The effective size of the active aperture 246 is controlled using depth dependent weights (apodization) on receive. On transmit the active aperture 246 may be selected depending on transmit focus depth. Elevation pre-focusing may also be accomplished, such as by using a lens (not shown) and/or forming at least a portion of the elements 104 in a curved arrangement, such as convex or concave.

By way of example only, during reception the system 100 may use a "dynamic aperture" approach in which the active receive azimuth aperture 246 grows with increasing imaging depth. This may be accomplished by multiplying the signal from each element 104 with different time dependent weights. Similarly, in elevation within the central portion 244, the elements 104 from the central row 206 may be given full weights for all depths, while elements 104 in the first and second outer rows 208 and 210 may be weighted in smoothly in response to increasing imaging depth. For a given depth, in one embodiment the effective weight of a given element 104 may be the product of its elevation and its azimuth weight. The weights, however, need not be separable in elevation and azimuth dimensions. Therefore, in another embodiment, for large depths and large azimuth apertures the elements 104 in the first and second outer rows 208 and 210 may be given full weight.

Figure 3:
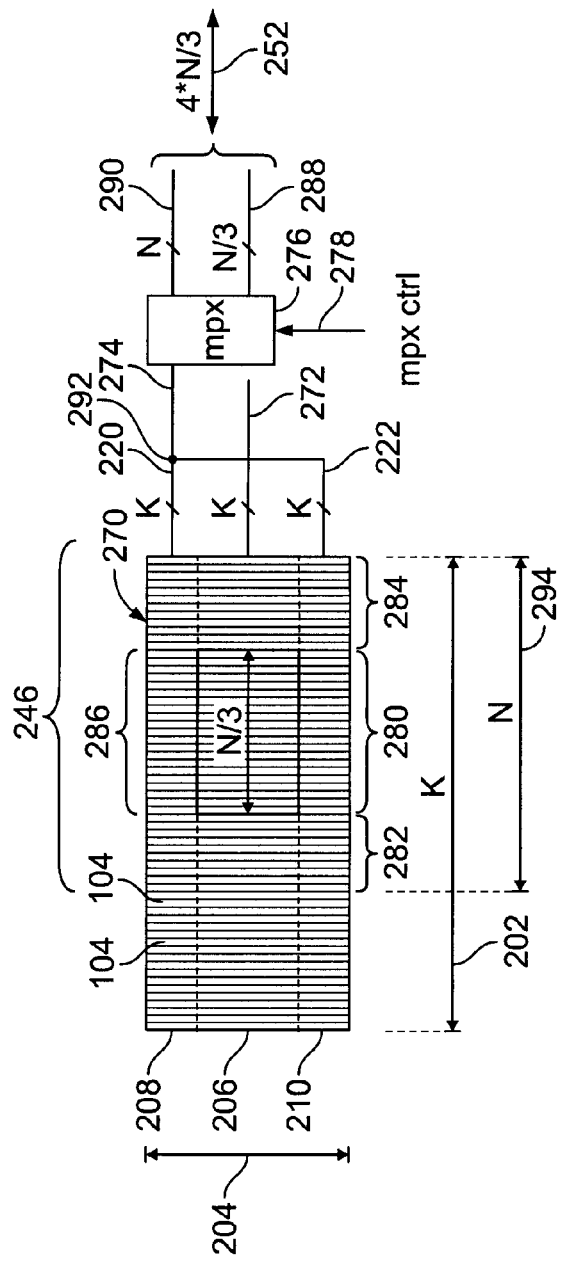
FIG. 3 illustrates another array of transducer elements configured to reduce the number of wires and system channels while allowing movement of a beamformed aperture in accordance with an embodiment of the present invention.

FIG. 3 illustrates an array 270 of elements 104 configured to reduce the number of wires and channels while allowing movement of the beamformed portion of the aperture 246. In other words, portion 286 may be moved along the azimuthal axis, or along the first dimension 202. In addition, the aperture 246 may be moved along the first dimension 202. In other embodiments, the aperture 246 may extend to include more elements 104 or all of the elements 104 in the array 270. The portion 286 may be positioned anywhere along the first dimension 202. In one embodiment, the ability to move the portion 286 may be useful for linear or curved linear arrays that have a switched movement of the beam apex.

There are K elements 104 along the first dimension 202. Multiplexing may be used to select a window of N elements 294 wherein N is less than K. Therefore, a system 100 that has a smaller number of channels may drive a transducer 106 that has a larger number of elements 104. The second and third sets of lines 220 and 222 each have K lines, and the elements 104 in the first and second outer rows 208 and 210 that are aligned with respect to each other along the second dimension 204 are electrically connected at point 292 as previously discussed. The second and third sets of lines 220 and 222 form a set of K lines 274. Each of the elements 104 in the central row 206 is electrically connected to one of K lines within a first set of lines 272.

The first set of lines 272 and the set of K lines 274 are connected to a programmable multiplexer 276 that is positioned within one of the transducer 106 and the cable 120. Alternatively, first, second and third sets of lines 272, 220 and 222 may connect directly to the multiplexer 276.

A multiplexer control line 278 is provided through the cable 120 and carries control signals from the transmitter 102 and/or beamformer 110. Although a single programmable multiplexer 276 is illustrated, it should be understood that more than one multiplexer may be used. Based on signals received over the multiplexer control line 278, the multiplexer 276 selects the elements 104 of the central row 206 that are used to form the active central portion 286 within the aperture 246. In this example, the multiplexer 276 selects a first portion 280 that has N/3 elements 104. In other embodiments, the first portion 280 may have more or less elements 104. Therefore, the multiplexer 276 may select a different number of elements 104 for the first portion 280 as long as the first portion 280 has less than the N elements. If more than N/3 elements 104 are selected, however, an equivalent number of extra wires 252 may need to be provided in the cable 120. Second and third portions 282 and 284 may have different numbers of elements 104 with respect to each other, and the size of the second and third portions 282 and 284 may change as the active aperture, the portion 286, is moved along the first dimension 202. In yet another embodiment, if the first portion 280 is configured to be at one end of the array 270 along the first dimension 202, only two portions may be defined. In yet another embodiment, more than one portion may be selected by the multiplexer 276 to be configured as a 1.5D configuration and separated by elements 104 configured in the 1D configuration. Therefore, more than one first portion 280 may be defined.

The multiplexer 276 connects each of the elements 104 within the first portion 280 to a separate line within a first set of lines 288. In this example, the first set of lines 288 has N/3 lines based on the size of the first portion 280. The multiplexer 276 also connects the elements 104 within the central row 206 that are within the second and third portions 282 and 284 to the elements 104 in the first and second outer rows 208 and 210 (set of K lines 274) that are aligned in columns with respect to each other along the second dimension 204. Alternatively, the multiplexer 276 may interface with both of the second and third sets of lines 220 and 222 and electrically connect appropriate elements 104. The set of K lines 274 and the electrical connections to the second and third portions 282 and 284 are represented by a second set of lines 290 having N lines, based on the number of elements 104 within the portion 286. The first and second sets of lines 288 and 290 connect to the wires 252 within the cable 120.

In one embodiment, if the first portion 280 has N/3 elements 104, the total number of wires 252 needed is 4N/3. If the first portion 280 is configured to have less or more than N/3 elements 104, less or more total wires 252, respectively, are needed in the cable 120. By way of example only, a 1.5D transducer having 288 elements 104 is considered. The elements 104 form an array of three rows having 96 elements 104 each. Previously, 192 channels within the system 100 and 192 wires within the cable 120 were needed. With the configuration of FIG. 2, a similar image quality may be obtained by having 128 channels and 128 wires 252 within the cable 120. With the configuration of FIG. 3, the transducer 106 may have more than 288 elements 104, but as the aperture 246 uses less than the total number of elements 104, the number of wires 252 is reduced accordingly. The cable 120 may thus be lighter in weight and have a greater flexibility, as well as a lower manufacturing cost.

Figure 4:
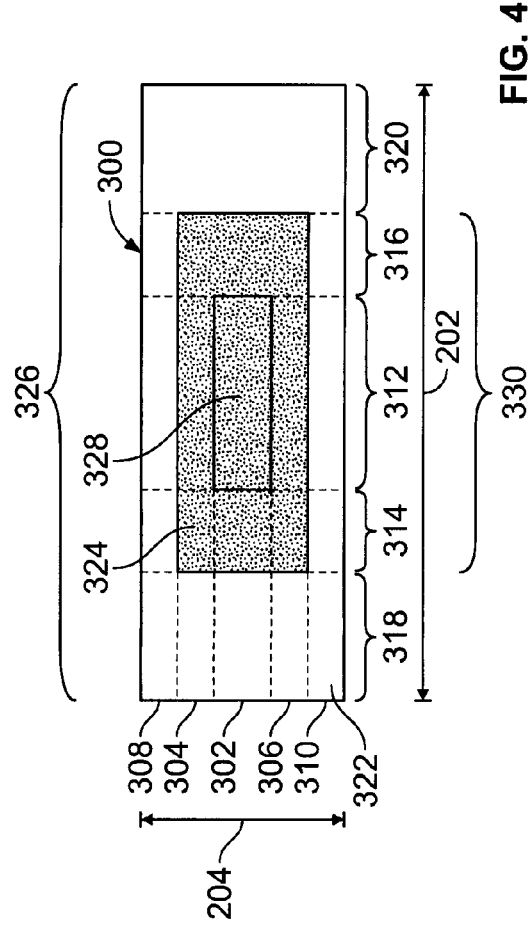
FIG. 4 illustrates yet another array of transducer elements configured to reduce the number of wires and system channels in accordance with an embodiment of the present invention.

FIG. 4 illustrates another array 300 of elements 104 configured to reduce the number of wires and channels needed to drive the associated transducer 106. The array 300 has five rows of elements 104, a center row 302, a first outer row 304, a second outer row 306, a third outer row 308 and a fourth outer row 310. More than five rows may be used, such as six or seven rows. Along the first dimension 202, the elements 104 may be divided into first, second, third, fourth and fifth portions 312, 314, 316, 318 and 320. The elements 104 that are aligned in columns with respect to each other in the second dimension 204 may be electrically connected as indicated by areas 322 and 324 and portion 328. Although not shown, a multiplexer, such as the multiplexer 276 of FIG. 3, may be used to allow movement of the portion 328 in the first dimension 202. In another embodiment, the multiplexer 276 may be used to move aperture 330 along the first dimension 202 within the entire array 300.

In the portion 328, each element 104 is electrically connected to a line as discussed previously. In the area 322, the elements 104 that are aligned in columns with respect to each other along the second dimension 204 may be electrically connected. For example, in the fourth and fifth portions 318 and 320, the elements 104 that are aligned in columns from each of the center row 302 and the first through fourth outer rows 304-310 is electrically connected to a single line. In the first, second and third portions 312, 314 and 316, an element 104 from each of the third and fourth outer rows 308 and 310 is electrically connected to one line.

In the area 324, the elements 104 that are aligned in columns with respect to each other along the second dimension 204 may be electrically connected. In the second and third portions 314 and 316, an element 104 from each of the center row 302 and the first and second outer rows 304 and 306 is electrically connected to a single line. In the first portion 312, an element 104 from each of the first and second outer rows 304 and 306 is electrically connected to a single line.

The elements 104 in the center row 302 may be larger than the elements 104 in the first through fourth outer rows 304-310. For example, an element 104 in the center row 302 may have approximately two times the elevational width as an element 104 in any of the first through fourth outer rows 304-310. By connecting elements 104 that have different sizes across an aperture, such as aperture 326 in FIG. 4 and aperture 246 in FIG. 3, different electrical impedances are created. This may lead to different channel gains, which may be caused by cable loading, receive input impedance, and the like. It is desirable to compensate for this gain variation, which may be accomplished by adjusting one or more beamformer parameters, such as gain, delay and amplitude. In addition, an array of circuit elements (not shown) may be added within the transducer 106 and/or cable 120 to compensate for configuration changes. Channel dependent gain compensation may be provided on receive by the beamformer 110, for example. The beamformer 110 may also provide compensation on the applied transmit voltage by changing the transmit amplitude. The beamformer compensation may be based on the different element sizes within the 1D and 1.5D sections of the array, and may change as the sections change in size and/or position along the array.

Figure 5:
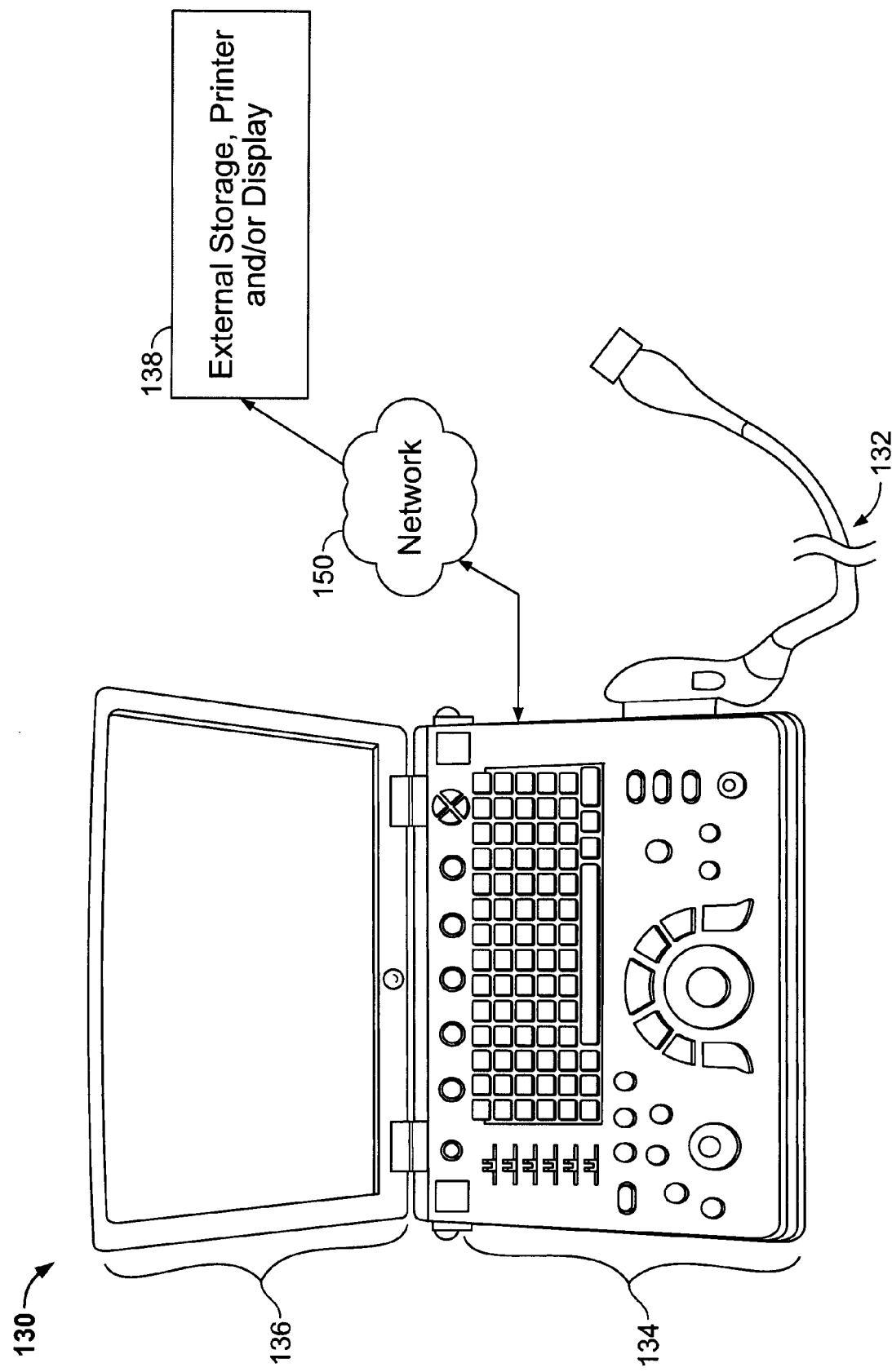
FIG. 5 illustrates a miniaturized ultrasound system formed in accordance with an embodiment of the present invention.

FIG. 5 illustrates a miniaturized ultrasound system 130 having a transducer 132 that may be configured based on the arrays of FIGS. 2, 3 and/or 4. A user interface 134 (that may also include an integrated display 136) is provided to receive commands from an operator. As used herein, "miniaturized" means that the ultrasound system 130 is a handheld or hand-carried device or is configured to be carried in a person's hand, pocket, briefcase-sized case, or backpack. For example, the ultrasound system 130 may be a hand-carried device having a size of a typical laptop computer, for instance, having dimensions of approximately 2.5 inches in depth, approximately 14 inches in width, and approximately 12 inches in height. The ultrasound system 130 may weigh about ten pounds, and thus is easily portable by the operator. The integrated display 136 (e.g., an internal display) is also provided and is configured to display a medical image.

The ultrasonic data may be sent to an external device 138 via a wired or wireless network 150 (or direct connection, for example, via a serial or parallel cable or USB port). In some embodiments, external device 138 may be a computer or a workstation having a display. Alternatively, external device 138 may be a separate external display or a printer capable of receiving image data from the hand carried ultrasound system 130 and of displaying or printing images that may have greater resolution than the integrated display 136.

As another example, the ultrasound system 130 may be a 3D capable pocket-sized ultrasound system. By way of example, the pocket-sized ultrasound system may be approximately 2 inches wide, approximately 4 inches in length, and approximately 0.5 inches in depth and weigh less than 3 ounces. The pocket-sized ultrasound system may include a display, a user interface (i.e., keyboard) and an input/output (I/O) port for connection to the transducer (all not shown). It should be noted that the various embodiments may be implemented in connection with a miniaturized ultrasound system having different dimensions, weights, and power consumption.

Figure 6:
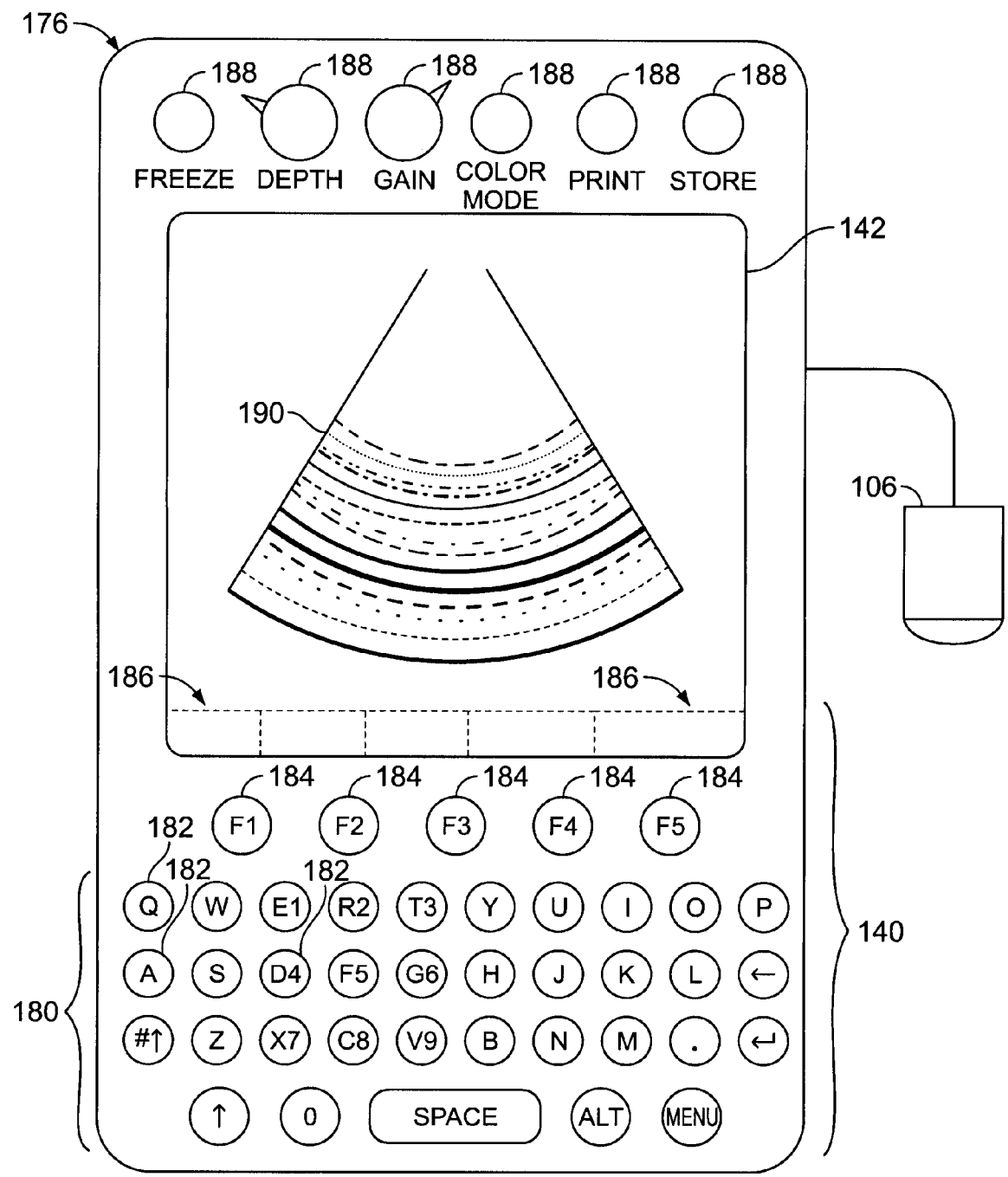
FIG. 6 illustrates a hand carried or pocket-sized ultrasound imaging system formed in accordance with an embodiment of the present invention.

FIG. 6 illustrates a hand carried or pocket-sized ultrasound imaging system 176 wherein the display 142 and user interface 140 form a single unit. By way of example, the pocket-sized ultrasound imaging system 176 may be a pocket-sized or hand-sized ultrasound system approximately 2 inches wide, approximately 4 inches in length, and approximately 0.5 inches in depth and weighs less than 3 ounces. The transducer 106 of FIG. 1 may be used. The display 142 may be, for example, a 320×320 pixel color LCD display (on which a medical image 190 may be displayed). A typewriter-like keyboard 180 of buttons 182 may optionally be included in the user interface 140.

Multi-function controls 184 may each be assigned functions in accordance with the mode of system operation. Therefore, each of the multi-function controls 184 may be configured to provide a plurality of different actions. Label display areas 186 associated with the multi-function controls 184 may be included as necessary on the display 142. The system 176 may also have additional keys and/or controls 188 for special purpose functions, which may include, but are not limited to "freeze," "depth control," "gain control," "color-mode," "print," and "store."

Figure 7:
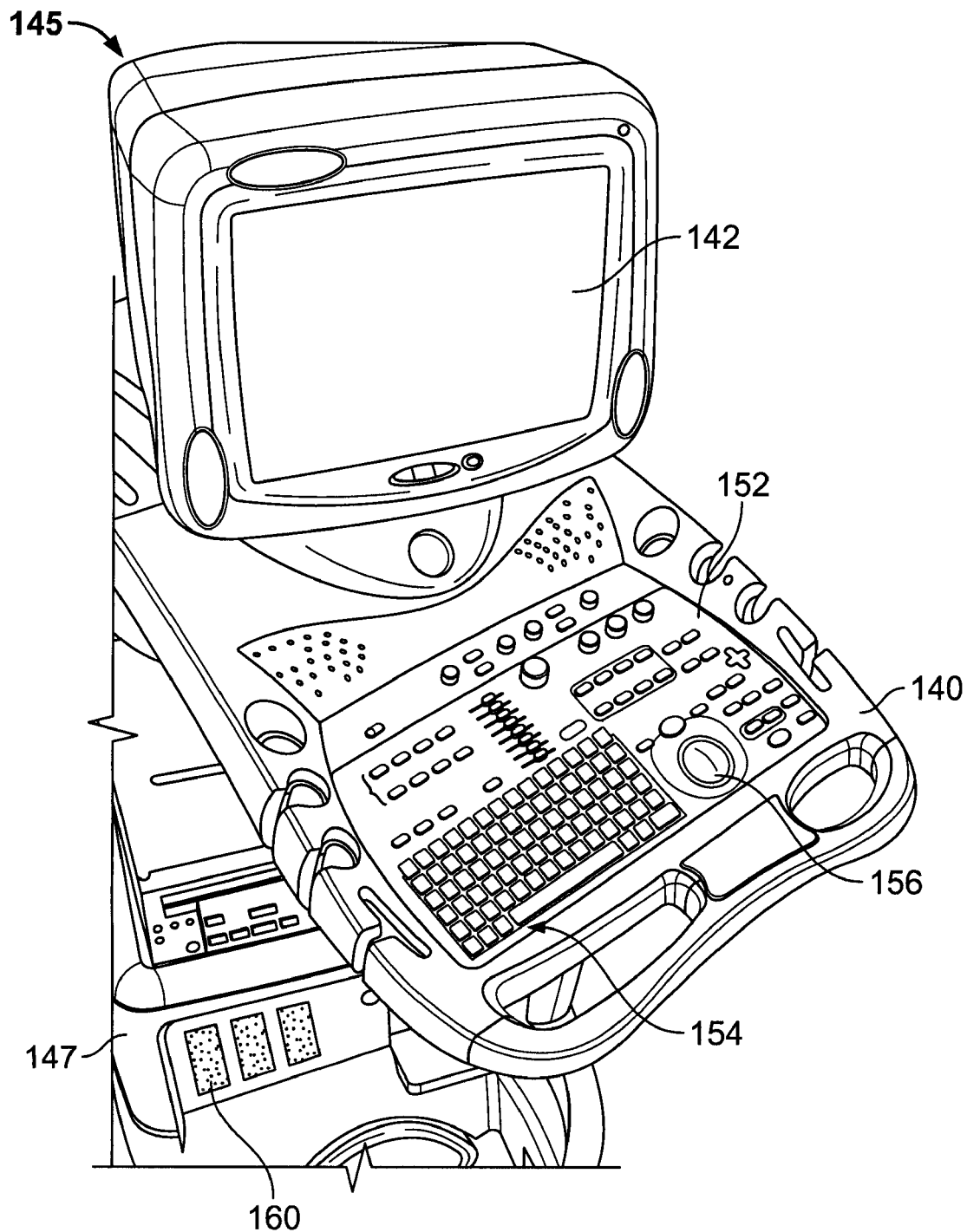
FIG. 7 illustrates a console-based ultrasound imaging system formed in accordance with an embodiment of the present invention.

FIG. 7 illustrates a console-based ultrasound imaging system 145 provided on a movable base 147, and may also be referred to as a cart-based system. A display 142 and user interface 140 are provided and it should be understood that the display 142 may be separate or separable from the user interface 140. The user interface 140 may optionally be a touchscreen, allowing the operator to select options by touching displayed graphics, icons, and the like.

The user interface 140 also includes control buttons 152 that may be used to control the portable ultrasound imaging system 145 as desired or needed, and/or as typically provided. The user interface 140 provides multiple interface options that the user may physically manipulate to interact with ultrasound data and other data that may be displayed, as well as to input information and set and change scanning parameters. The interface options may be used for specific inputs, programmable inputs, contextual inputs, and the like. For example, a keyboard 154 and track ball 156 may be provided. The system 145 has at least one transducer port 160 for accepting transducers, such as the transducer 106 of FIG. 1.

A technical effect of at least one embodiment is reducing the number of wires within a transducer cable, as well as reducing the number of system channels needed, without compromising image quality. An array of elements may be divided into portions wherein one portion is configured as a 1.5D array and at least one other portion is configured as a 1D array. The portion configured as a 1.5D array may be movable along the azimuthal dimension. Elevation focusing may be accomplished in both transmit and receive as well as dynamic focusing on receive. The portion of the aperture configured as a 1.5D array may be beamformed on transmit or receive using conventional delay processing. The effective size of the aperture may be controlled using depth dependent weights (apodization) on receive, and on transmit the active aperture may be selected depending on transmit focus depth.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. While the dimensions and types of materials described herein are intended to define the parameters of the invention, they are by no means limiting and are exemplary embodiments. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An ultrasound transducer, comprising:
an array of elements forming rows and columns, the array comprising a central row and at least first and second outer rows positioned along opposite sides of the central row;
wires within a transducer cable configured to connect at least a portion of the elements with an ultrasound system;
a first set of lines for electrically connecting each of the elements within a first portion of the central row to one of the wires, the first portion comprising less than a total number of the elements within the central row; and
a second set of lines for electrically connecting at least a portion of the elements within the first and second outer rows that are in a same column, the second set of lines further electrically connecting the elements within a second portion of the central row to the elements in the first and second outer rows that are in the same column as the elements within the second portion of the central row, each of the lines within the second set of lines being connected to one of the wires.

2. The transducer of claim 1, further comprising:
a multiplexer connected to the first and second sets of lines; and
a multiplexer control line within the transducer cable configured to connect the multiplexer and the ultrasound system, the multiplexer being configured to select a position of the first portion along the central row based on a signal received from the multiplexer control line.

3. The transducer of claim 1, further comprising:
a multiplexer connected to the first and second sets of lines; and
a multiplexer control line within the transducer cable configured to connect the multiplexer and the ultrasound system, the multiplexer being configured to select a number of elements within the first portion based on a signal received from the multiplexer control line.

4. The transducer of claim 1, further comprising a lens configured to pre-focus the array of elements at a predetermined elevation.

5. The transducer of claim 1, wherein the elements within the central row are larger than elements within the first and second outer rows.

6. The transducer of claim 1, further comprising:
third and fourth outer rows positioned along outside edges of the first and second outer rows, respectively; and
a third set of lines for electrically connecting at least a portion of the elements within the third and fourth outer rows that are in the same column, each of the lines within the third set of lines being connected to one of the wires.

7. A method for forming and using an ultrasound transducer, comprising:
- defining a number K of elements in a first dimension of an array;
- defining a number of rows in a second dimension of the array, wherein the number of rows is at least 3;
- connecting a first portion of the elements in a 1.5 dimensional (1.5D) array configuration; and
- concurrently connecting a second portion of the elements in a one-dimensional (1D) array configuration.

8. The method of claim 7, wherein the first portion comprises one of K/3 elements in the first dimension and N/3 elements in the first dimension wherein N is less than K.

9. The method of claim 7, further comprising adjusting a position of the first portion along the first dimension.

10. The method of claim 7, further comprising adjusting at least one beamformer parameter associated with at least one of the elements based on the 1D and 1.5D array configurations.

11. The method of claim 7, further comprising adjusting at least one of beamformer gain, beamformer delay and beamformer transmit voltage amplitude based on the 1D and 1.5D array configurations.

12. The method of claim 7, further comprising connecting a third portion of the elements in a 1D array configuration, the second and third portions being positioned on either side of the first portion along the first dimension, the first, second and third portions having one of a same number of elements and a different number of elements with respect to each other.

13. The method of claim 7, wherein the number of rows is 5 rows.

14. The method of claim 7, further comprising applying depth dependent weights to at least a portion of the elements based on at least a position of the first portion along the first dimension.

15. The method of claim 7, further comprising selecting an active aperture comprising at least the first portion of the elements based on a transmit focus depth.

16. An ultrasound transducer, comprising:
- an array of elements forming rows and columns, the array comprising at least a central row and at least first and second outer rows positioned along opposite sides of the central row;
- wires within a transducer cable configured to connect at least a portion of the elements to an ultrasound system; and
- a multiplexer being connected to the wires and to the elements, the multiplexer electrically connecting at least a portion of the columns of the elements within the first and second outer rows to each other and to one of the wires, the multiplexer being configured to select a first portion of the elements within the central row, the multiplexer electrically connecting each of the elements within the first portion to one of the wires, and the multiplexer electrically connecting at least a portion of the elements within the central row outside of the first portion to the corresponding columns of the elements within the first and second rows.

17. The transducer of claim 16, wherein the multiplexer is configured to select an aperture comprising the first portion of the elements and at least a second portion of the elements and wherein the first and second portions are less than a total number of the elements within the array.

18. The transducer of claim 16, wherein the multiplexer is further configured to select the number of elements within the first portion.

19. The transducer of claim 16, wherein the first portion is located at a central portion of the array.

20. The transducer of claim 16, wherein the multiplexer is configured to move the first portion based on scanning parameters received from the ultrasound system over the transducer cable.

21. The method of claim 7, wherein connecting the first portion of the elements and concurrently connecting the second portion of the elements result in the first portion of the elements being in the 1.5D array configuration and the second portion of the elements being in the 1D array configuration at the same time.

* * * * *